US007787997B2

(12) United States Patent
Richards et al.

(10) Patent No.: US 7,787,997 B2
(45) Date of Patent: Aug. 31, 2010

(54) MODULAR ELECTRIC POWER GENERATION SYSTEM AND METHOD OF USE

(75) Inventors: Randall Ray Richards, Chillicothe, IL (US); James Edward Chapman, Washington, IL (US); Noel Joy Rytter, Dunlap, IL (US); William Merwin Debord, Pekin, IL (US)

(73) Assignee: Caterpillar, Peoria, IL (US)

( * ) Notice: Subject to any disclaimer, the term of this patent is extended or adjusted under 35 U.S.C. 154(b) by 1160 days.

(21) Appl. No.: 11/412,882

(22) Filed: Apr. 28, 2006

(65) Prior Publication Data

US 2007/0254196 A1 Nov. 1, 2007

(51) Int. Cl.
H01M 8/00 (2006.01)
(52) U.S. Cl. .................. 700/291; 700/288; 700/297; 429/13; 429/19; 429/22
(58) Field of Classification Search .................. 700/28, 700/32, 33, 286–288, 291, 297; 429/12, 429/13, 19–22, 24, 25, 34, 38–40, 46
See application file for complete search history.

(56) References Cited

U.S. PATENT DOCUMENTS

| 4,798,082 | A | | 1/1989 | Fujikawa et al. | |
|---|---|---|---|---|---|
| 5,314,762 | A | * | 5/1994 | Hamada et al. | 429/37 |
| 6,071,326 | A | | 6/2000 | Hall | |
| 6,090,312 | A | | 7/2000 | Ziaka et al. | |
| 6,153,943 | A | * | 11/2000 | Mistr, Jr. | 290/52 |
| 6,172,427 | B1 | * | 1/2001 | Shinohara et al. | 290/40 B |
| 6,183,895 | B1 | * | 2/2001 | Kudo et al. | 429/20 |
| 6,522,030 | B1 | | 2/2003 | Wall et al. | |
| 6,576,360 | B2 | * | 6/2003 | Kawasumi et al. | 429/22 |
| 6,631,310 | B1 | | 10/2003 | Leslie | |
| 6,777,123 | B2 | * | 8/2004 | Okamoto | 429/24 |
| 6,824,905 | B2 | * | 11/2004 | Shioya et al. | 429/22 |
| 6,877,581 | B2 | | 4/2005 | Badr et al. | |
| 7,397,217 | B2 | * | 7/2008 | Van Brocklin et al. | 320/101 |
| 7,575,823 | B2 | * | 8/2009 | Kabasawa | 429/13 |

(Continued)

FOREIGN PATENT DOCUMENTS

FR 2770287 4/1999

(Continued)

*Primary Examiner*—Crystal J Barnes-Bullock
(74) *Attorney, Agent, or Firm*—Finnegan, Henderson, Farabow, Garrett & Dunner LLC

(57) ABSTRACT

A self-contained, modular electric power generation system includes a portable housing having a modular shell disposed substantially on a foundation, wherein the portable housing is configured to facilitate the transportation of the modular electric power generation system. The system also includes a power generator disposed substantially within the portable housing. The power generator is configured to collect fuel associated with a fuel source and convert at least a portion of the collected fuel to electrical energy. The system also includes a sensing device configured to be coupled to the fuel source. The sensing device is configured to monitor a fuel level associated with the fuel source and provide data indicative of the fuel level to a management console associated with the power generation system. The system also includes a controller coupled to the power generator. The controller is configured to monitor an amount of fuel consumed by the conversion process, and provide data indicative of the amount of fuel consumed by the conversion process to the management console.

17 Claims, 4 Drawing Sheets

U.S. PATENT DOCUMENTS

| | | |
|---|---|---|
| 7,588,852 B2 * | 9/2009 | Shioya ................... 429/34 |
| 2002/0062594 A1 | 5/2002 | Erickson |
| 2002/0173979 A1 | 11/2002 | Daggett et al. |
| 2003/0188863 A1 | 10/2003 | Gilbert et al. |
| 2004/0039684 A1 | 2/2004 | Sandor |
| 2004/0088179 A1 | 5/2004 | Cogen et al. |
| 2004/0158478 A1 | 8/2004 | Zimmerman |
| 2004/0177607 A1 * | 9/2004 | Suzuki et al. ............. 60/286 |
| 2004/0249732 A1 | 12/2004 | Drummond |
| 2005/0154669 A1 | 7/2005 | Streetman |
| 2005/0162122 A1 | 7/2005 | Dunn et al. |
| 2005/0249992 A1 * | 11/2005 | Bitoh ..................... 429/24 |
| 2006/0015424 A1 | 1/2006 | Esposito, II et al. |
| 2009/0023021 A1 * | 1/2009 | Norimatsu et al. ......... 429/19 |

FOREIGN PATENT DOCUMENTS

| | | |
|---|---|---|
| WO | WO 03/103864 | 12/2003 |

\* cited by examiner

MODULAR ELECTRIC POWER GENERATION SYSTEM AND METHOD OF USE

TECHNICAL FIELD

The present disclosure relates generally to electric power generation systems and, more particularly, to modular electric power generation systems and methods associated therewith.

BACKGROUND

Biogas and other types of natural gas generally refer to methane gas produced as a result of anaerobic decay of non-fossil organic matter. Methane gas and other greenhouse gases have been identified by the Intergovernmental Panel on Climate Change as potential contributors to the effects of climate change (such as global warming) on the environment. Methane, for example, has a global warming potential (GWP) 23 times greater than that of carbon dioxide, indicating that a molecule of methane has the potential to store 23 times more radiant energy than a molecule of carbon dioxide. As a result, many organizations have resolved to reduce the amount of greenhouse gas emissions by limiting or reducing the amount and/or type of greenhouse gas emissions that they are responsible for.

Decaying or fermenting waste, such as that contained in landfills, biological waste facilities, and agricultural waste facilities, may produce large amounts of methane gas that may potentially be emitted into the environment. One method to reduce these emissions includes capturing the methane gas produced by these sources and burning the gas in an electric power generation system to generate electricity, which can be subsequently sold. In some cases, the conversion of methane to carbon dioxide during the combustion process may generate greenhouse gas credits. These credits may be used by an organization to reduce its amount of greenhouse gas equivalent emissions in order to comply with an emission limit imposed by a government or other regulatory agency. In addition to the sale of electric energy, these credits may be sold or traded on a greenhouse gas commodity market, providing a valuable source of supplemental revenue.

Methane gas produced from decaying matter, such as landfill waste, typically includes a production lifecycle that coincides with the lifecycle of the landfill. For example, as the landfill grows and waste is added, the amount of methane gas produced increases proportional to the landfill growth. However, as the landfill reaches capacity, the methane production level begins to taper off, and, as the landfill goes out of service and the amount of decaying matter in the landfill declines, the production of methane gas also declines. Thus, in order to maximize the cost effectiveness and efficiency of power generation and greenhouse gas production associated with biogas sources whose production level varies over time, a modular power generation system that can expand and contract with the methane production level may be required.

At least one system has been developed to provide portable power generation and distribution capabilities to areas where electric power may not be available. For example, U.S. Pat. No. 6,877,581 ("the '581 patent") to Badr et al. describes an integral power generation and distribution system that includes an engine-generator unit positioned on top of two axles coupled to ground-engaging wheels. The system may be coupled to a ground transport machine for transporting the power system to a desired location. The system of the '581 patent may also be communicatively and/or electrically coupled to other power systems for providing common control, generation, and distribution facilities. The system may also include integrated circuit breakers and generator switchgear for selectively connecting one or more of the generators to a main distribution bus.

Although the system of the '581 patent may provide portable and expandable power generation capabilities in certain cases, it may be inadequate in other situations. For example, because the system of the '581 patent is configured to use only fuel stored in on-board fuel tanks, it may not contain the components necessary for filtering and refining fuels collected directly from an environmental source. As a result, power plant environments that use raw, unfiltered fuels may require costly filtration and refinement equipment in order to employ the power generation systems of the '581 patent.

In addition, the system of the '581 patent is not configured to generate greenhouse gas credits using methane or other biogases collected from the environment. In fact, the system of the '581 patent may do nothing to reduce greenhouse gas equivalent emissions. Moreover, because the system of the '581 is configured to use only conventional fossil fuels, organizations that employ the system may actually increase their greenhouse gas emissions. As a result, organizations that wish to reduce the greenhouse gas equivalent emissions associated with their operations may become ineffective.

The presently disclosed modular power generation system is directed toward overcoming one or more of the problems set forth above.

SUMMARY OF THE INVENTION

In accordance with one aspect, the present disclosure is directed toward a self-contained, modular electric power generation system comprising a portable housing having a modular shell disposed substantially on a foundation, wherein the portable housing is configured to facilitate the transportation of the modular electric power generation system. The system may also include a power generator disposed substantially within the portable housing. The power generator may be configured to collect fuel associated with a fuel source and convert at least a portion of the collected fuel to electrical energy. The system may also include a sensing device configured to be coupled to the fuel source. The sensing device may be configured to monitor a fuel level associated with the fuel source and provide data indicative of the fuel level to a management console associated with the power generation system. The system may also include a controller coupled to the power generator. The controller may be configured to monitor an amount of fuel consumed by the conversion process, and provide data indicative of the amount of fuel consumed by the conversion process to the management console.

According to another aspect, the present disclosure is directed toward a method for operating a modular power plant environment. The method may include providing one or more power generation modules in a power plant environment. The method may also include collecting, in the one or more power generation modules, fuel associated with a fuel source. The method may further include converting at least a portion of the collected fuel to electrical energy via a combustion process. The method may also include monitoring a fuel production level associated with a fuel source of the power plant environment. The method may further include determining a fuel consumption rate associated with the power generation system. The method may also include adjusting an operational aspect associated with the power generation modules based on one or more of the fuel production level or the fuel consumption rate.

In accordance with another aspect, the present disclosure is directed toward a modular power plant environment. The environment may include a fuel source. The environment may also include at least one modular electric power generation system. The at least one modular electric power generation system may include a portable housing having a modular shell disposed substantially on a foundation, wherein the portable housing is configured to facilitate the transportation of the modular electric power generation system. The at least one modular electric power generation system may also include a power generator disposed substantially upon the foundation. The power generator may be configured to collect fuel associated with the fuel source and convert at least a portion of the collected fuel to electrical energy. The at least one modular electric power generation system may further include a sensing device configured to be coupled to the fuel source. The sensing device may be configured to monitor a fuel level associated with the fuel source and provide data indicative of the fuel level to a management console associated with the power generation system. The at least one modular electric power generation system may also include a controller coupled to the power generator. The controller may be configured to monitor an amount of fuel consumed by the conversion process and provide data indicative of the amount of fuel consumed by the conversion process to the management console. The management console, coupled to the at least one power generation system associated with the power plant environment, may be configured to analyze the data indicative of the fuel level and the amount of fuel consumed and adjust an operational aspect associated with the power generation modules based on one or more of the fuel production level or the fuel consumption rate.

DETAILED DESCRIPTION

Figure 1:
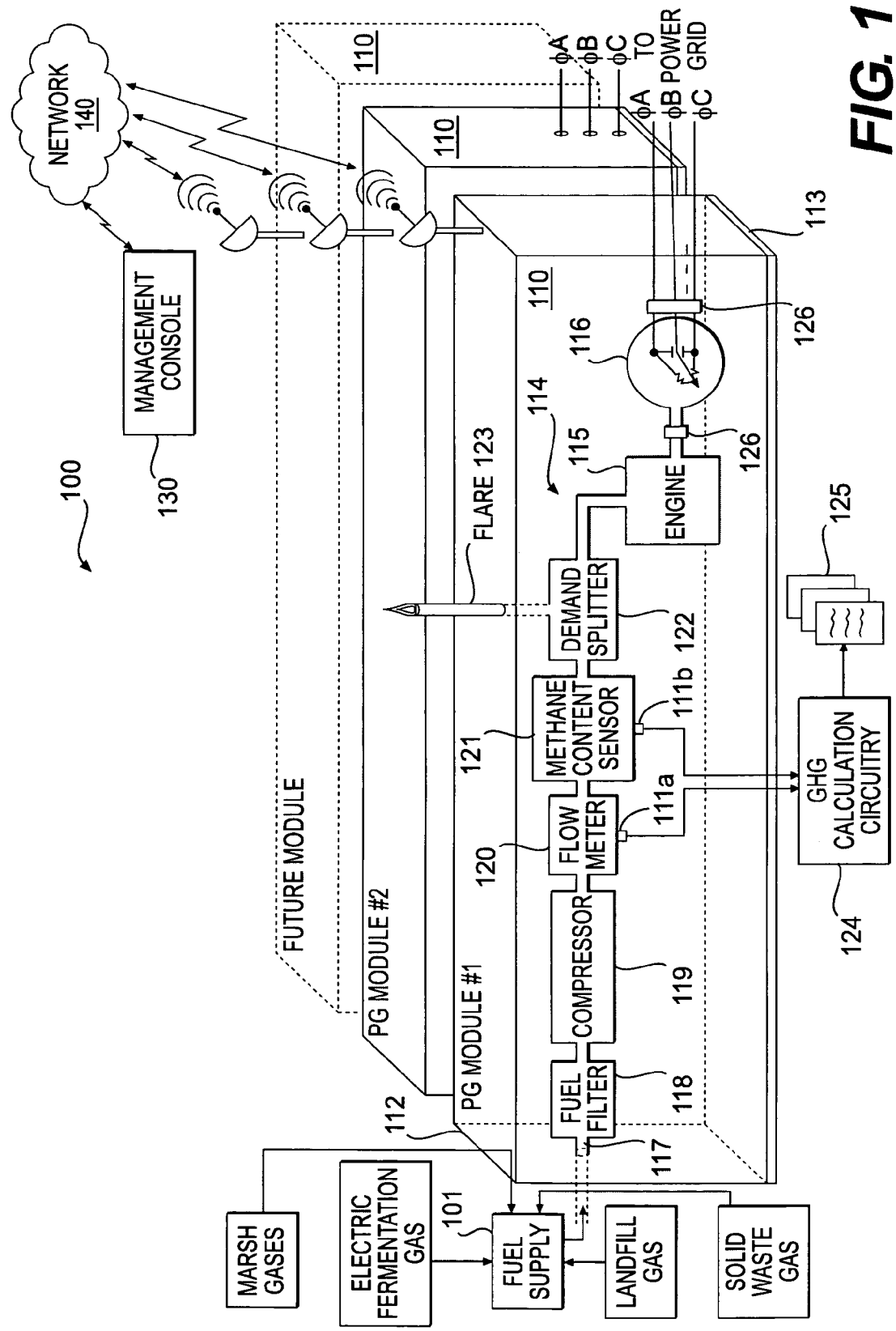
FIG. 1 illustrates an exemplary disclosed modular power plant environment consistent with certain disclosed embodiments.

FIG. 1 illustrates an exemplary power plant environment 100 consistent with the disclosed embodiments. Power plant environment 100 may include any type of environment in which a greenhouse gas, such as methane or other biogas, may be collected and used as fuel for generating electric power. Alternatively and/or additionally, power generation environment 100 may include any environment employing a greenhouse gas conversion process for generating greenhouse gas credits. Power plant environment 100 may include, among other things, a methane fuel source 101 that produces methane gas, at least one modular power generation system 110, and a management console 130. It is contemplated that power plant environment 100 may include additional, fewer, and/or different components than those listed above.

Methane fuel source 101 may include one or more sources of methane gas associated with power plant environment 100. Methane fuel source 101 may include any methane-producing facility such as, for example, a landfill site, a mine site, a natural gas site, a subterranean methane site, an agricultural or biological waste facility, an enteric fermentation site, a marsh or swamp, or any other suitable source of methane. Alternatively and/or additionally, methane fuel source 101 may include a collection facility that collects methane from one or more methane-producing facilities and stores the methane for future use. Accordingly, methane fuel source may includes various fuel tanks, compressors, transport pipes, pumps, and other types of equipment used to facilitate the collection, storage, and distribution of methane gas associated with power plant environment 100.

Modular power generation system 110 may be configured to provide a transportable source of electric energy for power plant environment 100. To facilitate transportation, modular power generation system 110 may include a housing 112 disposed substantially on a foundation 113 configured to support one or more components associated with modular power generation system 110. Modular power generation system 110 may also include a power generator 114, one or more sensing devices 111, and a controller 127 configured to facilitate communications between modular power generation system 110 and management console 130. It is contemplated that modular power generation system 110 may include additional, fewer, and/or different components than those listed above.

Modular power generation system 110 may be in fluid communication with one or more methane fuel sources 101. Alternatively and/or additionally, modular power generation system 110 may be fluidly coupled to a portion of methane fuel source 101 that is located in proximity with the modular power generation system 110. For example, a methane fuel source associated with a landfill site that encompasses a large area may include various methane fuel sources corresponding to portions of the landfill that may be heavily used, thus corresponding to high methane production. Accordingly, one or more modular power generation systems 110 may be located in proximity to those portions of the landfill site that correspond to high levels of methane production.

Housing 112 and foundation 113 may together comprise a transport and housing container associated with modular power generation system 110. Housing 112 may include any type of prefabricated, preformed, manufactured, and/or conventional constructed structure that serves to protect and contain one or more components associated with modular power generation system 110. Foundation 113 may include any type of foundation suitable for transporting and supporting heavy loads, such as those associated with modular power generation system 110. For example, foundation 113 may include a reinforced concrete slab, a poured stone-composite foundation, or any other foundation that can provide support for modular power generation system 110 during transport and throughout the operational lifespan of the unit.

Power generator 114 may include any type of power generation system adapted to convert mechanical energy to electrical energy through a combustion conversion process. Power generator 114 may include a power source 115 fluidly coupled to a fuel intake port 117 and configured to rotate a shaft coupled to an electric generator 116 to produce an electrical power output. Power generator 114 may also include a fuel filter 118, a flow meter 120, a methane content sensor 121, and a demand splitter 122. It is contemplated that power generator 114 may include additional, fewer, and/or different components than those listed above. For instance, according to one embodiment, power generator 116 may include one or more compressors 119 and fuel lines for facilitating compression and transportation of the gas between one or more components associated with power generator 114.

Power source 115 may include any type of power supply that uses methane gas to provide a mechanical power output. For example, power source 115 may burn the methane gas to rotate a shaft to produce a mechanical power. Power source 115 may include any type power source adapted to use methane gas as a fuel source such as, for example, an internal combustion engine, a gas turbine engine, a fuel cell, or any other type of methane driven power source.

Electric generator 116 may include one or more components configured to convert mechanical energy to electrical energy. Electric generator 116 may include, among other things, one or more coils of wire rotated with respect to a permanent magnet, which facilitates the flow of electrons within the one or more coils of wire. According to one embodiment, electric generator 116 is configured to produce 3-phase electric power and may be adapted as part of a power transmission and distribution grid associated with power plant environment 100. Although electric generator 116 and power source 115 are illustrated as separate components, it is contemplated that electric generator 116 and power source 115 may be combined to form an integral engine-generator system (e.g., genset, etc.).

Electric generator 116 may be selectively coupled to one or more electric components via electronic switchgear 126. Switchgear 126 may include circuit breakers, relays, transformers, and/or other devices adapted to provide selective coupling between electric generator 116 and other components of modular power generation system 110. Alternatively and/or additionally, electric generator 116 may be selectively coupled, via one or more circuit breaking devices, to one or more external components and/or systems associated with power plant environment 100 such as, for example, electric power storage devices, an electric power transmission grid, or an electric power distribution grid.

Fuel filter 118 may include any type of sediment or particle filter suitable for the filtration of methane prior to use with modular power generation system 110. Alternatively and/or additionally, fuel filter 118 may facilitate the removal of water from methane that is collected from environmental and/or atmospheric sources. Fuel filter 118 may include a membrane-type or fiber type filter and may be adapted for use with either liquid or gaseous fuels.

Flow meter 120 may include any type of sensing device configured to measure a flow of methane gas associated with power generator 114. Flow meter 120 may include any type of fluid or gas flow meter such as, for example, a piston meter, a venturi meter, a jet meter, an orifice plate meter, or any other type of meter. Flow meter 120 may be configured to measure the flow by measuring a volume or pressure of the substance passing through it and calculating a flow rate of the substance, based on the measurement.

Methane content sensor 121 may include any type of sensor adapted to measure a methane content associated with the gas collected from methane source 101. Methane content sensor 121 may include, for example, a catalytic sensor, a metal oxide sensor, an infrared sensor, a hot-wire sensor, or any other suitable type of gas sensor. According to one embodiment, methane content sensor may include a high frequency detector/receiver pair that projects a beam of electromagnetic radiation across a sample of the gas. Based on a detected value compared with a nominal value associated with pure methane, a concentration of methane gas may be derived. Methane content sensor 121 may also determine and/or measure an amount of methane consumed during the combustion process, based on the measured methane content data.

Flow meter and methane content sensor may be communicatively coupled to a greenhouse gas monitoring device 124. Greenhouse gas monitoring device may be configured to determine, based on data collected from power plant environment 100, an amount of greenhouse gas credits 125 produced during the methane combustion process. For example, greenhouse gas monitoring device 124 may receive methane flow data measured by flow meter 120 and consumption data measured by methane content sensor 121. Greenhouse gas monitoring device 124 may determine, based on the received data, an amount of greenhouse gas credits produced by one or more modular power generation systems 110. Although greenhouse gas monitoring device 124 is illustrated as a standalone device, it is contemplated that greenhouse gas monitoring device 124 may be included within management console 130. Alternatively and/or additionally, greenhouse gas monitoring device 124 may be implemented, at least in part, in software associated with one or more of management console 130 and/or modular power generation system 110.

Demand splitter 122 may include any type of flow control device configured to modify the flow of fuel associated with modular power generation system 110. For example, demand splitter 122 may include a bypass valve, a shut-off valve, a flow splitter, or any other suitable type flow control mechanism. According to one embodiment, demand splitter 122 may include a bypass valve coupled to a flaring device 123 that allows for provides a mechanism to maintain methane combustion (thereby maintaining greenhouse gas credit production) should the power generator 114 become inoperable. Although demand splitter 122 and flaring device 123 are illustrated as being included as part of modular power generation system 110, it is contemplated that demand splitter 122 and flaring device 123 may be external, standalone components with respect to modular power generation system 110. Similarly, one or more modular power generation system 110 may share demand splitter 122 and/or flaring device 123 so that, for example, multiple demand splitters feed a single flaring device dedicated to the power plant environment 100.

Management console 130 may include any system for collecting, monitoring, analyzing, reporting, recording, or storing data associated with power plant environment 100. For example, management console 130 may include one or more computer systems, control units, monitoring devices, or data collection instruments that may be communicatively coupled to one or more components (e.g., one or more modular power generation systems 110, methane fuel source 101, etc.) associated with power plant environment 100. According to one embodiment, management console 130 may include a computer system, including software configured to monitor and control operations associated with power plant environment 100. Operation of management console 130 and/or software associated therewith will be described in detail below.

Furthermore, although management console 130 is illustrated as a standalone component of power plant environment 100, it is contemplated that management console 130 may be integrated within one or more components of power plant environment 100. For example, according to one alternate embodiment, one or more modular power generation systems 110a-c may each include its own management console. Each management console may be interconnected via a communication network 140. In this embodiment, one management console may be adapted as the master console, for carrying out certain control operations associated with power plant environment 100.

Management console 130 may be communicatively coupled to power plant environment 100, or one or more components thereof, via communication network 140. Communication network 140 may include any type of communication platform (and any associated infrastructure) adapted to facilitate communications within power plant environment 100. Communication network 140 may support any wireline communication platform such as Ethernet, optical fiber communications, LAN, WAN (e.g., the Internet), or any other wire-based communication system. Alternatively and/or additionally, communication network 140 may be adapted to support any wireless communication platform such as, for example, Ethernet, point-to-point wireless, satellite, Bluetooth, cellular, WLAN, Wi-Fi, or any other type of wireless communication platform. Communication network 140 may also include any site-based or remote communication equipment that supports client-based connectivity such as, for example, antennas, network cards, modems, communication media such as cables, data links, etc., or any other type of communication device for use with communication network 140.

Figure 2:
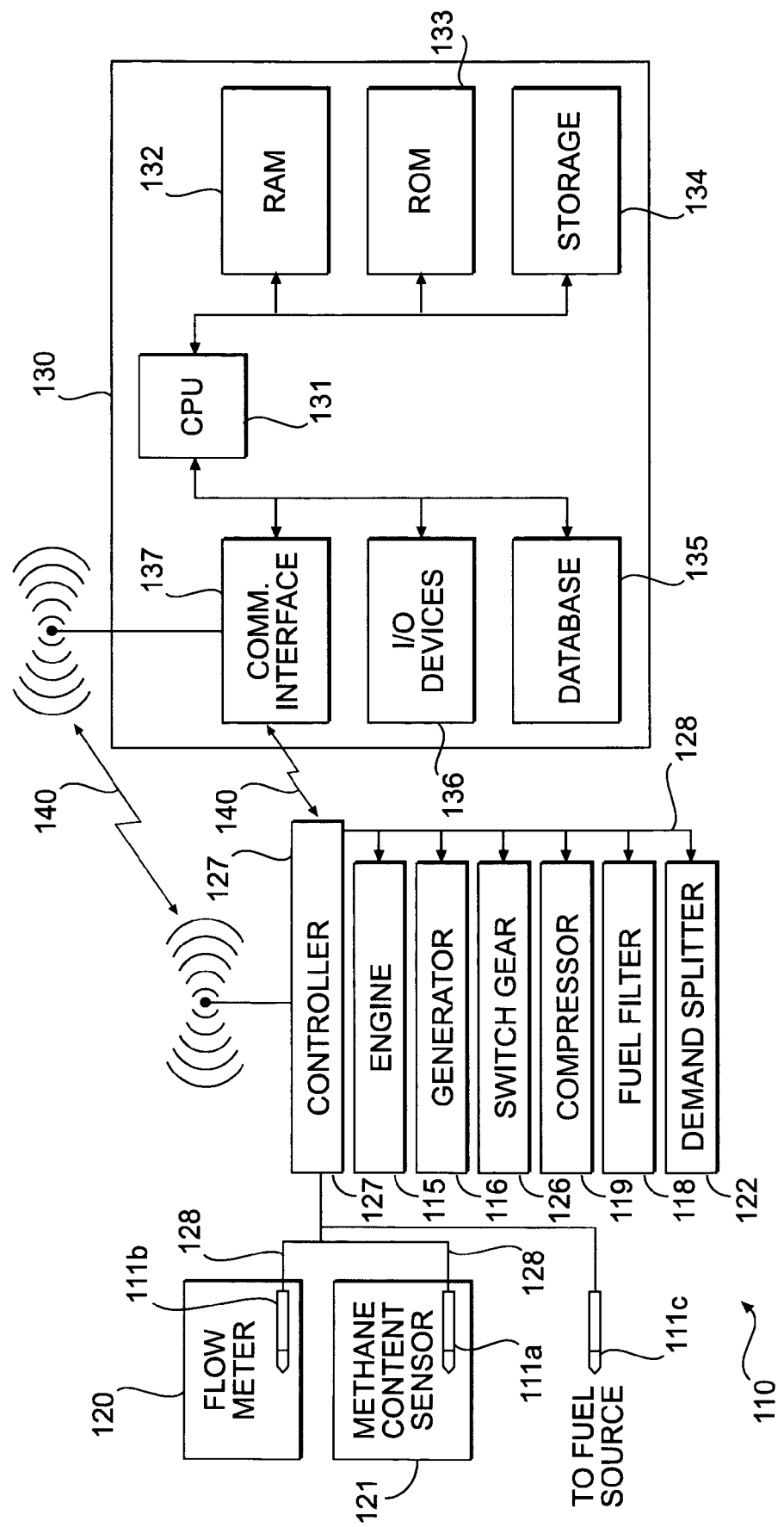
FIG. 2 illustrates an exemplary disclosed schematic associated with a modular power generation system consistent with the disclosed embodiments.

FIG. 2 provides a schematic illustration depicting an exemplary plant environment consistent with the disclosed embodiments. As illustrated in FIG. 2, modular power generation system 110 may include a controller 127 communicatively coupled to each component of modular power generation system 110 via communication lines 128. Communication lines 128 may include any type of media (wireline or wireless) suitable to facilitate data communication between controller and components and/or subsystems of modular power generation system 110.

Controller 127 may include any type of integrated monitoring and control system configured to collect, monitor, record, analyze, and communicate data associated with modular power generation system 110, and manage operations associated with the system based on the data. For example, controller 127 may include a power system controller, an electronic control unit (ECU), a computer system including control software, or any other suitable device or system for monitoring and/or controlling operations associated with modular power generation system 110. For instance, controller 127 may monitor and analyze operations associated with each component of modular power generation system 110 and, based on the monitoring, adjust one or more operational aspects associated with the system.

In addition to flow meter 120 and methane content sensor 121, one or more additional sensing devices 111 may be provided. Sensing devices 111 may include any device for collecting or monitoring data associated with power plant environment 100. For example, sensing devices 111 may include one or more sensors such as, for example, a pressure sensor, a temperature sensor, a vibration sensor, a gas content sensor, a flow rate sensor, or any other type of sensor. Sensing devices 111 may be configured to monitor one or more operational aspects associated with power plant environment 100 or one or more components associated therewith. According to one embodiment, one or more sensing devices 111c may be configured to collect data indicative of a methane level associated with methane fuel source 101. Sensing devices 111 may each be in data communication with controller 127 and provide collected data to controller 127 automatically or, alternatively, on-demand (e.g., in response to a request from controller 127).

Management console 130 may include any type or processor-based system on which processes and methods consistent with the disclosed embodiments may be implemented. For example, as illustrated in FIG. 2, management console 130 may include one or more hardware and/or software components configured to execute software programs, such as software for managing power plant environment 100, greenhouse gas credit determination and validation software, or customized software configured to monitor and control one or more modular power generation systems 110. For example, management console 130 may include one or more hardware components such as, for example, a central processing unit (CPU) 131, a random access memory (RAM) module 132, a read-only memory (ROM) module 133, a storage 134, a database 135, one or more input/output (I/O) devices 136, and an interface 137. Alternatively and/or additionally, management console 130 may include one or more software components such as, for example, a computer-readable medium including computer-executable instructions for performing methods consistent with certain disclosed embodiments. It is contemplated that one or more of the hardware components listed above may be implemented using software. For example, storage 134 may include a software partition associated with one or more other hardware components of management console 130. Management console 130 may include additional, fewer, and/or different components than those listed above. It is understood that the components listed above are exemplary only and not intended to be limiting.

CPU 131 may include one or more processors, each configured to execute instructions and process data to perform one or more functions associated with management console 130. As illustrated in FIG. 2, CPU 131 may be communicatively coupled to RAM 132, ROM 133, storage 134, database 135, I/O devices 136, and interface 137. CPU 131 may be configured to execute sequences of computer program instructions to perform various processes, which will be described in detail below. The computer program instructions may be loaded into RAM for execution by CPU 131.

RAM 132 and ROM 133 may each include one or more devices for storing information associated with an operation of management console 130 and/or CPU 131. For example, ROM 133 may include a memory device configured to access and store information associated with management console 130, including information for identifying, initializing, and monitoring the operation of one or more components and subsystems of management console 130. RAM 132 may include a memory device for storing data associated with one or more operations of CPU 131. For example, ROM 133 may load instructions into RAM 132 for execution by CPU 131.

Storage 134 may include any type of mass storage device configured to store information that CPU 131 may need to perform processes consistent with the disclosed embodiments. For example, storage 134 may include one or more magnetic and/or optical disk devices, such as hard drives, CD-ROMs, DVD-ROMs, or any other type of mass media device.

Database 135 may include one or more software and/or hardware components that cooperate to store, organize, sort, filter, and/or arrange data used by management console 130 and/or CPU 131. For example, database 135 may include one or more predetermined threshold levels associated with a monitored methane level of methane source 101. CPU 131 may access the information stored in database 135 for comparing the measured data with the threshold data to determine whether operational adjustments associated with power plant environment 100 may be required. It is contemplated that database 135 may store additional and/or different information than that listed above.

I/O devices 136 may include one or more components configured to communicate information with a user associated with management console 130. For example, I/O devices may include a console with an integrated keyboard and mouse to allow a user to input parameters associated with management console 130. I/O devices 136 may also include a display including a graphical user interface (GUI) for outputting information on a monitor. I/O devices 136 may also include peripheral devices such as, for example, a printer for printing information associated with management console 130, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 137 may include one or more components configured to transmit and receive data via a communication network, such as the Internet, a local area network, a workstation peer-to-peer network, a direct link network, a wireless network, or any other suitable communication platform. For example, interface 137 may include one or more modulators, demodulators, multiplexers, demultiplexers, network communication devices, wireless devices, antennas, modems, and any other type of device configured to enable data communication via a communication network.

Management console 130 may be configured to monitor one or more operations associated with power plant environment 110 and manage the environment based on analysis of the monitored data. For example, according to one embodiment, management console 130 may be configured to collect data associated with an amount of methane used by each modular power generation system 110. Additionally, management console 130 may collect data associated with an methane level associated with methane fuel source 101. Based on the methane level and the amount of methane used, management console 130 may request the addition or removal of one or more modular power generation systems 110 to ensure that power plant environment 100 operates at peak efficiency.

In addition to managing operational aspects associated with power plant environment 100 (and/or one or more components associated therewith), management console 130 may be configured to manage the greenhouse gas credit production associated with power plant environment 100. For example, management console 130 may receive data associated with an amount of methane used by each modular power generation system 110. Management console 130 may determine, based on the received data, a quantity of greenhouse gas credits associated with the methane combustion process. Alternatively and/or additionally, management console 130 may be coupled to a greenhouse gas credit validation system (not shown) to request validation for any greenhouse gas credits generated by power plant environment 100.

Figure 3:
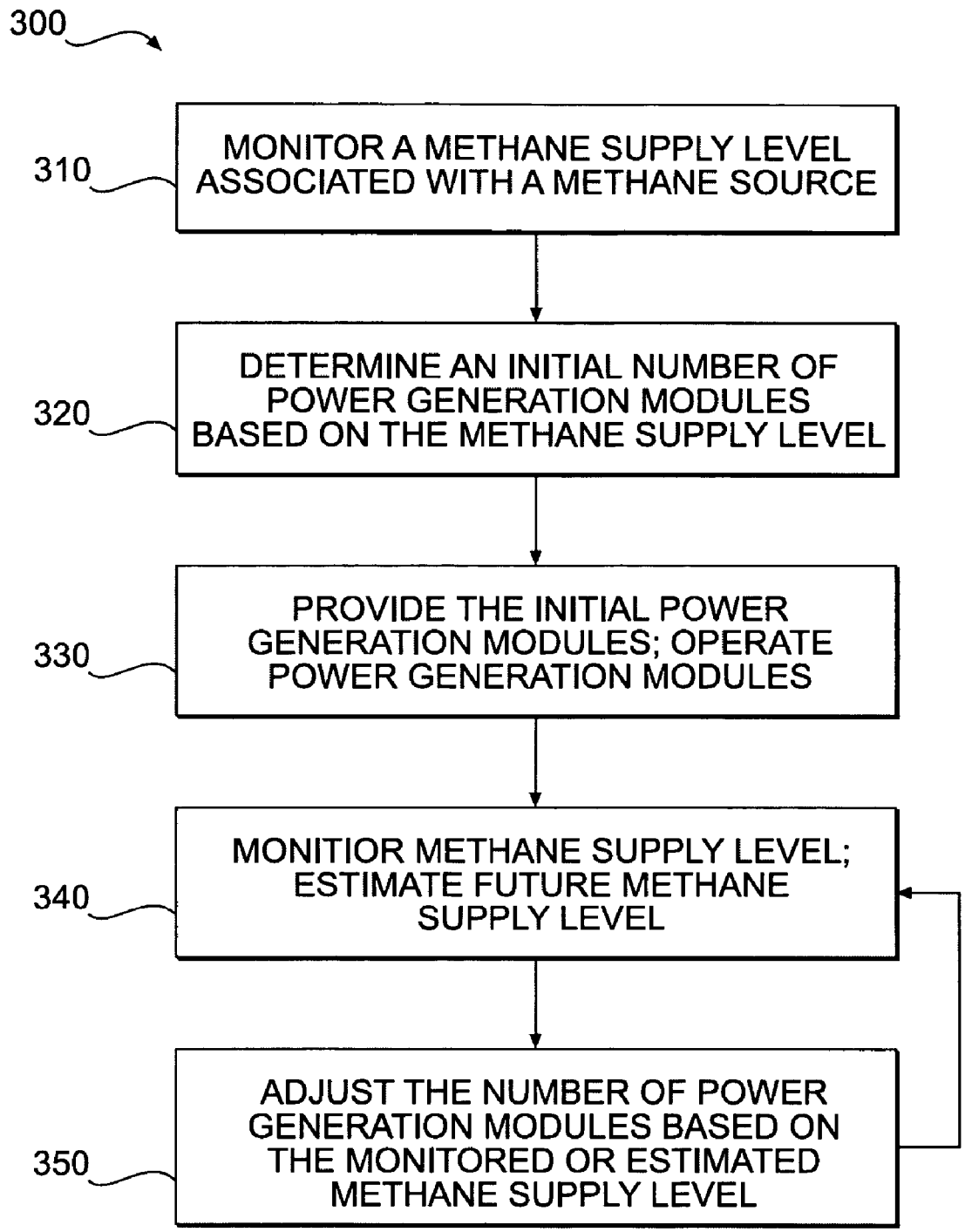
FIG. 3 provides a flowchart depicting an exemplary method of operating the power plant environment of FIG. 1.

Processes and methods consistent with the disclosed embodiments may provide a power plant environment adapted for use with biogas collected from an environmental source capable of expanding and contracting based on the production of fuel from a fuel source. For example, FIG. 3 provides a flowchart 300 depicting an exemplary disclosed method for operating power plant environment 100. The method may comprise monitoring a methane supply level associated with a methane source (Step 310). For example, according to one embodiment, a methane level associated with a landfill site may be monitored to determine the amount of methane produced by the landfill site. It is contemplated that certain portions of the landfill site may produce more methane than other portions depending upon the amount and type of waste associated with different portions or areas of the landfill. Accordingly, monitoring the fuel supply level may include monitoring various portions of the landfill to locate areas of high methane production.

Once a methane level associated with the fuel source has been established based on the measured data, an initial number of modular power generations systems to be deployed at or near the methane source may be determined (Step 320). For example, management console 130 may estimate, that the particular methane level associated with the methane source may be sufficient to sustain 3 MW of power generation. Management console 130 may subsequently determine that 3 1-MW modular power generation systems may initially be provided to meet the production level associated with the methane source. It is contemplated that different types of modular power generation systems may be allocated. For example, instead of allocating 3 1-MW systems, management console may allocate 2 1.5-MW systems or 1 3-MW system. Given the modular nature of each power generation system it is contemplated that various sizes and types of power generation systems may be manufactured, and that those skilled in the art would recognize that modular power generation systems may be adapted to provide various power generation capacities.

Once an initial number of power generation modules has been determined, management console may request (or otherwise facilitate) the deployment of the modules to the methane source (Step 330). As previously explained, these power generation modules may be selectively coupled to the power transmission and/or distribution grid with switchgear and, optionally, metering equipment to enable the collection of fees associated with the power generation. Alternatively and/or additionally, the power generation systems may be adapted for use exclusively in a campus-type environment and used solely to meet private and/or local power supply requirements.

Once the power generation modules have been deployed, installed, and are operational, the methane supply and/or methane production level may be monitored and a future methane supply level may be estimated (Step 340). For example, once the power generation systems have become operational, management console 130 may monitor the methane level associated with the methane source to determine any changes that may be required in the number of power generation systems to meet the methane production level. Alternatively and/or additionally, future methane levels associated with the methane source may be estimated in order to predict future expansion (or contraction) of one or more power generation modules.

Once the methane level has been monitored and/or a future methane level has been determined, the number of modular power generation systems may be adjusted based on present methane levels and/or future production trends associated with the methane source (Step 350). According to one embodiment, in response to an increase in production level, management console 130 may request additional power generation systems. Similarly, in response to a decrease in methane production, management console may request that one or more existing units be removed or relocated to other methane source locations.

In addition to adjusting the number of systems associated with a methane source, operations associated with each generation system may be adjusted based on present and/or future methane levels. For example, to accommodate an increase in the methane production associated with the methane source, management console 130 may cause one or more power generation systems to operate at an increased capacity corresponding to the methane production increase. Similarly, management console 130 may reduce the methane consumption corresponding to a present or projected decrease in the methane level associated with the source.

According to yet another embodiment, management console 130 may operate (or facilitate the operation of) demand splitter 122 in response to an increase in the methane level. Accordingly, in addition to the consumption of methane by power source 115 to produce electric energy, methane may also be combusted by flaring device 123 so that any methane produced that may not otherwise be combusted by power source 115 may be consumed. This additional consumption of methane may ensure that during periods of increased production, any methane that is produced is subsequently consumed by some methane conversion process, so as to reduce the potential for emission into the atmosphere, thereby maximizing the greenhouse gas credit generation potential associated with the methane source. It is also contemplated that, instead of diverting methane to a flaring device, demand splitter may divert any surplus methane produced by methane source to a methane storage device.

In accordance with yet another embodiment, adjustments to power plant environment 100 may be made based on one or more methane production threshold levels. According to this embodiment, adjustments may be based on the methane production level associated with a methane source relative to a methane consumption level associated with power plant environment 100. For example, if a methane production level exceeds the methane consumption level (corresponding to an increase in methane production), management console 130 may order additional power generation modules. Alternatively, if the methane consumption level exceeds the methane production level by a first threshold amount (corresponding to a slight decrease in methane production level), management console may adjust one or more power generation modules to simply consume less methane. However, if the methane consumption level exceeds a methane production level by a second threshold amount (corresponding to a significant decrease in methane production and, potentially, an indication that the methane production life-cycle of the methane source is on the decline), management console may request that one or more modular power generation systems be removed from power plant environment 100 and/or relocated to a different methane source within power plant environment 100.

Figure 4:
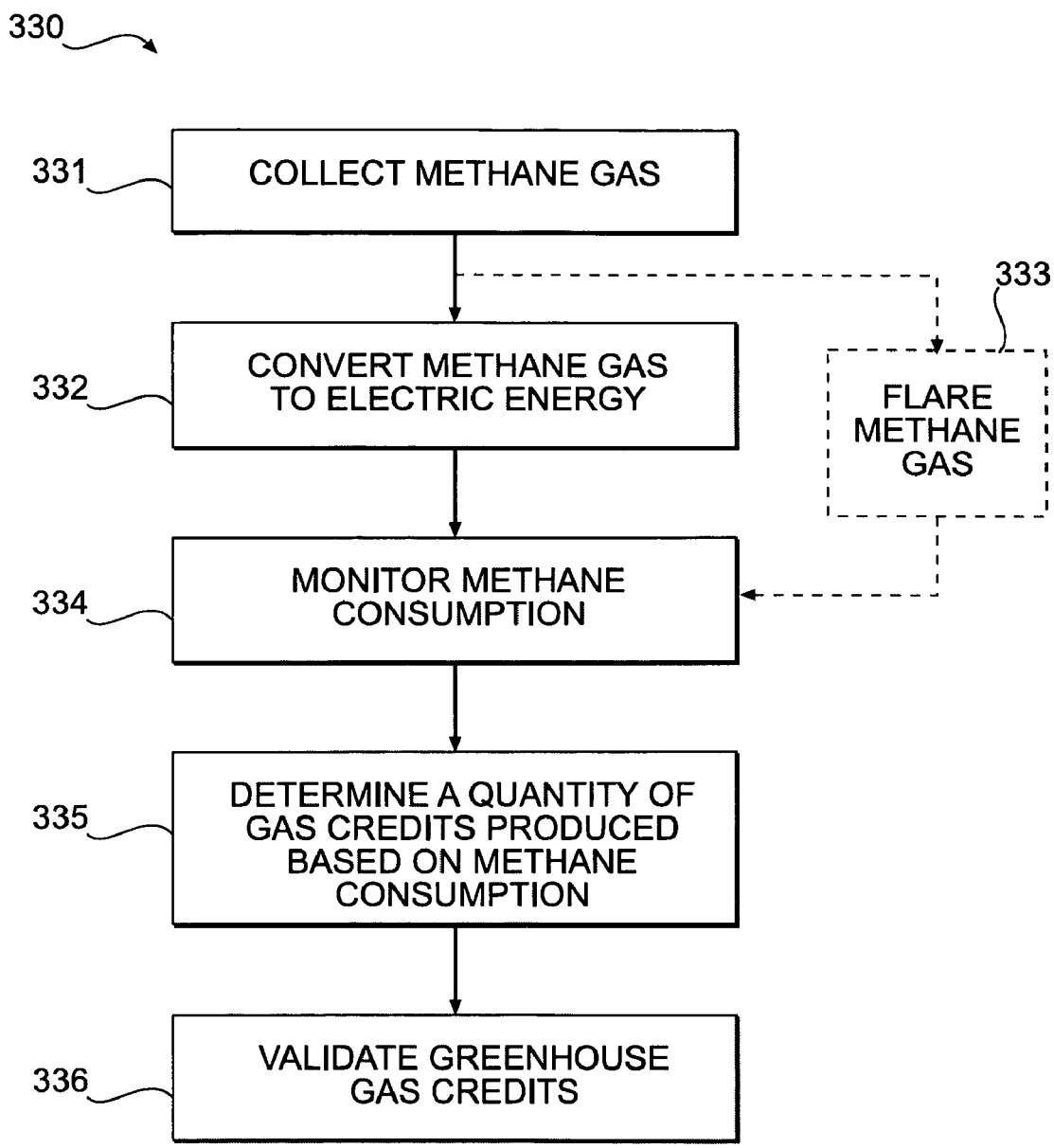
FIG. 4 provides a flowchart depicting an exemplary method of operation associated with a modular power generation system.

Processes and methods associated with certain disclosed embodiments provide a modular and expandable power plant environment that, in addition to enabling modular power generation associated with an environmental methane source, allow for the generation of greenhouse gas credits resulting from the methane combustion conversion processes of each of the modules. FIG. 4 provides a flowchart 330 illustrating a method for dual operation (i.e., power generation and greenhouse gas credit production) associated with each modular power generation system. As illustrated in FIG. 4, one or more power generation systems may each collect methane gas associated with a methane source (Step 331) and convert the methane gas to electric energy (Step 332), in accordance with the disclosed embodiments.

Alternatively and/or in addition to the conversion of methane to electric energy, one or more power generation systems may flare the methane gas using a flaring device associated with one or more of the modular power generation systems (Step 333). For example, in the event that a power generator associated with a modular power generation system is offline or otherwise inoperable, a splitter may be activated to divert the flow of methane gas to a flaring device adapted to burn the methane.

During the methane combustion process, a methane consumption level may be determined (Step 334). For example, as previously explained, flow meter 120 and methane content sensor 121 may each be adapted to collect data and provide the collected data to controller 127, which may subsequently transmit the data to management console 130. Management console 130 may then determine, based on data collected from flow meter 120 and methane content sensor 121, an amount of methane consumed during the combustion process.

Once the amount of methane consumed by the combustion process has been determined, a quantity of greenhouse gas credits produced by each of modular power generation systems may be determined (Step 335). For example, greenhouse gas calculation software may determine how many metric tons of methane has been consumed and, based on the determination, and calculate the corresponding quantity of greenhouse gas credits.

Upon calculation of the quantity of greenhouse gas credits, management console 130 may validate (or facilitate the validation of) the greenhouse gas credits (Step 336). For example, management console 130 may apply for greenhouse gas credits by submitting the appropriate forms and any other required documentation to a sanctioned greenhouse gas credit issuing body. According to one embodiment, management console 130 may be in electronic communication with a greenhouse gas credit-issuing body and may electrically apply for the greenhouse gas credits electronically.

INDUSTRIAL APPLICABILITY

Although methods and systems associated with the disclosed embodiments have been described in relation to certain power plant environments, it is generally applicable to any environment where it may be desirable to employ power systems that can be adjusted to accommodate a fuel production life cycle. In one exemplary embodiment, the modular power generation system may be adapted to collect methane gas from biogas sources, such as landfills, waste treatment facilities, marshes, or agricultural waste facilities.

The presently disclosed modular power generation system may have several advantages. For example, because modular power generation system 110 may be adapted to burn environmental methane gas, as opposed to burning fossil fuels as in some conventional systems, the presently disclosed system may reduce the net emissions of greenhouse gas to the environment. That is, the presently disclosed system may substantially reduce the net GWP of gases that would otherwise be emitted into the environment. Accordingly, the presently disclosed modular power generation system may enable organizations to reduce the carbon dioxide equivalent emissions associated with their power generation operations.

In addition, the presently disclosed modular power generation system may have significant cost advantages. For example, because the system is configured to collect fuel from external fuel sources, particularly those associated with low production and refinement costs (such as biogas or environmental methane), fuel costs may be substantially lower than systems using other types of fuel. Furthermore, because the presently disclosed system can collect fuel directly from a fuel production source, it may not require periodic refueling in order to maintain operations. As a result, modular power generation systems consistent with the disclosed embodiments may be deployed in extremely remote areas, where refined sources of fuel may not be available.

It will be apparent to those skilled in the art that various modifications and variations can be made to the disclosed modular electric power generation system and associated method. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A modular electric power generation system, comprising:
a power generator configured to:
collect fuel associated with a fuel source; and
convert at least a portion of the collected fuel to electrical energy;
a sensing device configured to be coupled to the fuel source and configured to:
monitor a fuel level associated with the fuel source; and
provide data indicative of the fuel level to a management console associated with the power generation system; and
a controller coupled to the power generator and configured to:
monitor an amount of fuel consumed by the conversion process; and
provide data indicative of the amount of fuel consumed to the management console;
wherein the management console is configured to:
analyze the data indicative of the fuel level and the amount of fuel consumed;
provide a request for additional power generation systems, if the fuel level exceeds the amount of fuel consumed; and
provide a request to reduce a power generation capability associated with a power generation environment, if the fuel level is below a predetermined threshold.

2. The system of claim 1, wherein reducing the power generation capability includes reducing a quantity of power generation systems associated with the fuel source.

3. The system of claim 2, wherein reducing the power generation capability includes reducing the amount of fuel consumed by the power generator.

4. The system of claim 1, wherein the fuel includes methane gas and the fuel source further includes one or more of a landfill site, a subterranean fuel source, a mine site, an agricultural site, a natural gas system, or an enteric fermentation system.

5. The system of claim 4, wherein the power generator is further configured to generate greenhouse gas credits based on an amount of methane consumed by the conversion process.

6. The system of claim 4, wherein the power generator further includes a splitter fluidly coupled to the fuel source and configured to:
provide, in a first state, substantially all of the methane to an engine system for combusting the fuel to generate electric energy; and
provide, in a second state, substantially all of the methane to a flaring device for combusting the fuel to prevent an environmental emission of the methane when the engine is inoperable.

7. The system of claim 1, wherein the power generator is selectively coupled to at least one of an electric power storage device, an electric power transmission grid, or an electric power distribution grid and configured to produce three-phase, AC power.

8. A method for operating a modular power plant environment comprising:
providing one or more power generation modules in a power plant environment;
collecting, in the one or more power generation modules, fuel associated with a fuel source;
converting at least a portion of the collected fuel to electrical energy;
monitoring a fuel production level associated with the fuel source;
determining a fuel consumption rate associated with the power generation modules; and
adjusting an operational aspect associated with the power generation modules based on one or more of the fuel production level or the fuel consumption rate;
wherein adjusting the operational aspects associated with the power generation modules includes:
providing, if the fuel production level exceeds a fuel consumption rate, one or more additional power generation modules to the power plant environment; and
reducing, if the fuel consumption rate exceeds the fuel production level by a threshold amount, one or more of a number of power generation modules or fuel consumption rate.

9. The method of claim 8, wherein the fuel includes methane gas and wherein determining a fuel consumption rate associated with the power generation system further includes:
calculating, based on the fuel consumption rate, an amount of methane converted into carbon dioxide during the conversion process;
determining a quantity of greenhouse gas credits based on the calculation; and
validating the quantity of greenhouse gas credits.

10. The method of claim 8, wherein the fuel includes methane gas and the fuel source includes one or more of a landfill site, a subterranean fuel source, a mine site, an agricultural site, a natural gas system, or an enteric fermentation system.

11. The method of claim 8, wherein the reducing further includes:
reducing, if the fuel consumption rate exceeds the fuel production level by a first threshold amount, a fuel consumption rate associated with the power plant environment; and
reducing, if the fuel consumption rate exceeds the fuel production level by a second threshold amount, the number of power generation modules associated with the power plant environment.

12. The method of claim 8, wherein the converting includes combusting the at least a portion of the collected fuel to produce electrical energy.

13. The method of claim 8, wherein converting includes combusting the at, least a portion of the collected fuel using a flaring device.

14. A modular power plant environment comprising:
a fuel source;
at least one modular electric power generation system, each comprising:
a power generator selectively coupled to at least one of an electric power storage device, an electric power transmission grid, or an electric power distribution grid and configured to produce three-phase, AC power and configured to:
collect fuel associated with the fuel source; and
convert at least a portion of the collected fuel to electrical energy;
a sensing device configured to be coupled to the fuel source and configured to:
monitor a fuel level associated with the fuel source; and provide data indicative of the fuel level to a management console associated with the power generation system; and a controller coupled to the power generator and configured to:

monitor an amount of fuel consumed by the conversion process; and provide data indicative of the amount of fuel consumed by the conversion process to the management console; and the management console, coupled to the at least one power generation system associated with the power plant environment, configured to:

analyze the data indicative of the fuel level and the amount of fuel consumed; and adjust an operational aspect associated with the power generation modules based on one or more of the fuel level or the fuel consumption.

15. The environment of claim 14, wherein the power generator further includes a splitter fluidly coupled to the fuel source and configured to:

provide, in a first state, substantially all of the fuel to an engine system for combusting the fuel to generate electric energy; and provide, in a second state, substantially all of the methane to a flaring device for combusting the fuel to prevent an environmental emission of the methane when the engine is inoperable.

16. The environment of claim 14, wherein the fuel includes methane gas and wherein the management console is further configured to:

calculate, based on the fuel consumption rate, an amount of methane converted into carbon dioxide during the conversion process;

determine a quantity of greenhouse gas credits based on the calculation; and validate the quantity of greenhouse gas credits.

17. The environment of claim 14, wherein the management console is further configured to:

analyze the data indicative of the fuel level and the amount of fuel consumed;

provide a request for additional power generation systems, if the fuel level exceeds the amount of fuel consumed; and provide a request to reduce a power generation capability associated with a power generation environment, if the fuel level is below a predetermined threshold.

* * * * *